(12) United States Patent
Weissert

(10) Patent No.: US 10,065,144 B2
(45) Date of Patent: Sep. 4, 2018

(54) FILTER PLANT WITH A SELF-REGULATING CLEANING SYSTEM

(71) Applicant: Paul Wurth Umwelttechnik GmbH, Essen (DE)

(72) Inventor: Thilo Weissert, Bochum (DE)

(73) Assignee: PAUL WURTH UMWELTTECHNIK GMBH, Essen (DE)

( * ) Notice: Subject to any disclaimer, the term of this patent is extended or adjusted under 35 U.S.C. 154(b) by 205 days.

(21) Appl. No.: 15/026,943

(22) PCT Filed: Sep. 26, 2014

(86) PCT No.: PCT/EP2014/070637
§ 371 (c)(1),
(2) Date: Apr. 1, 2016

(87) PCT Pub. No.: WO2015/049177
PCT Pub. Date: Apr. 9, 2015

(65) Prior Publication Data
US 2016/0220939 A1 Aug. 4, 2016

(30) Foreign Application Priority Data

Oct. 2, 2013 (EP) .................................... 13187103

(51) Int. Cl.
*B01D 46/00* (2006.01)
*B01D 46/44* (2006.01)
(52) U.S. Cl.
CPC ....... *B01D 46/446* (2013.01); *B01D 46/0068* (2013.01)

(58) Field of Classification Search
CPC ... B01D 46/00; B01D 46/0068; B01D 46/446
USPC .................................... 95/15, 19–21; 55/284
See application file for complete search history.

(56) References Cited

U.S. PATENT DOCUMENTS 5,439,494 A    8/1995  Tullis et al.
5,837,017 A *  11/1998  Santschi ............ B01D 46/0068
                                                    55/302

OTHER PUBLICATIONS

International Preliminary Report on Patentability and Written Opinion dated Apr. 14, 2016 re: Application No. PCT/EP2014/070637; pp. 1-9.
International Search Report dated Nov. 3, 2014 re: Application No. PCT/EP2014/070637; pp. 1-2; citing: U.S. Pat. No. 5,837,017 A and U.S. Pat. No. 5,439,494 A.

* cited by examiner

*Primary Examiner* — T. Bennett McKenzie
(74) *Attorney, Agent, or Firm* — Cantor Colburn LLP

(57) ABSTRACT

According to the invention, the filter plant comprises a gas feed (compressed air feed system) which supplies the filter plant with a cleaning medium at a feed pressure pN. The filter plant also comprises a cleaning tank which is fed by the gas feed and in which the cleaning medium is stored at a cleaning pressure pT. Furthermore, the filter plant also comprises a pressure filter with a filter pressure pF. The pressure filter is cleaned cyclically in pre-determined time intervals or in a manner dependent on differential pressure by the cleaning medium from the cleaning tank.

12 Claims, 1 Drawing Sheet

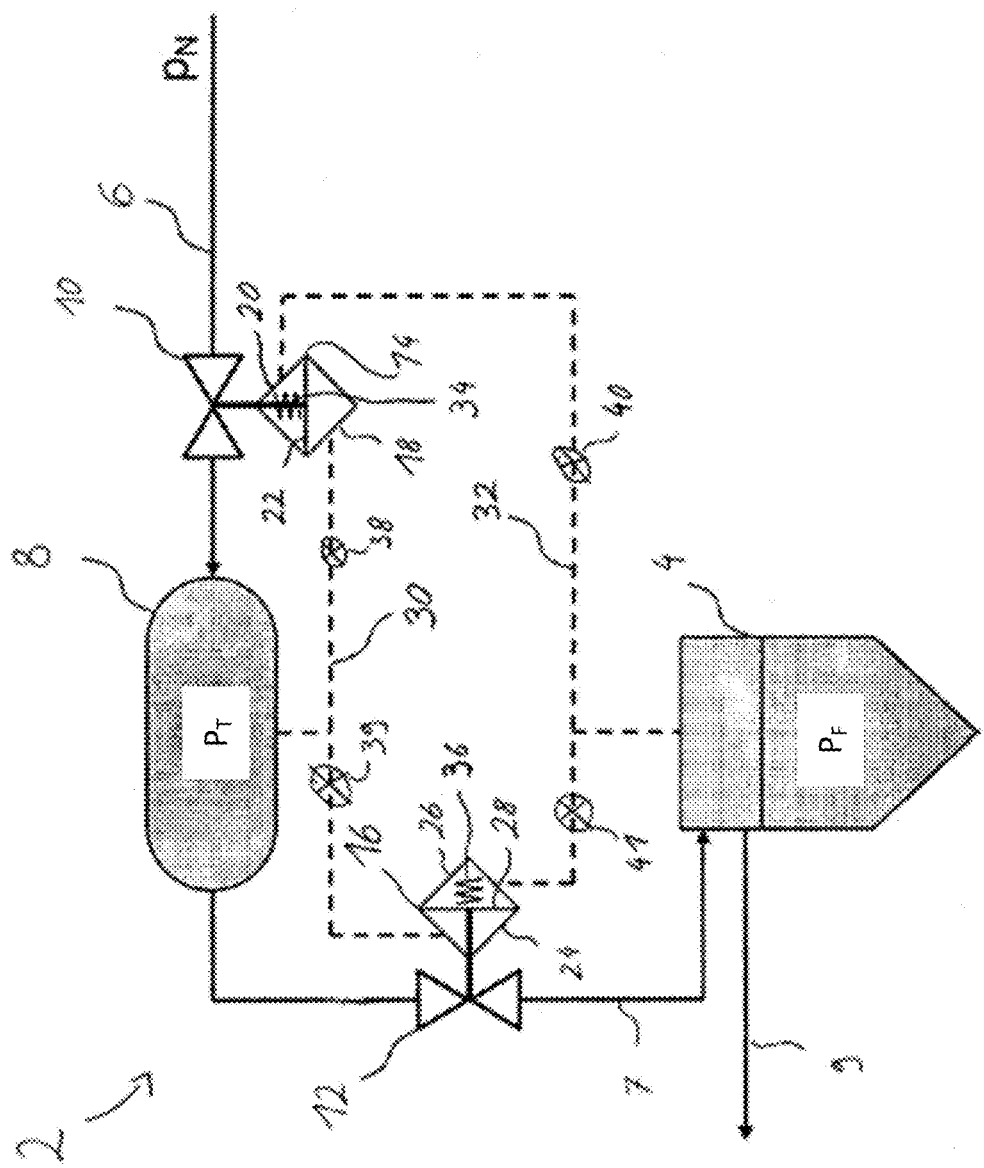

FILTER PLANT WITH A SELF-REGULATING CLEANING SYSTEM

TECHNICAL FIELD

The present invention relates in general to a filter installation with a self-regulating cleaning system. The invention is suitable particularly for cleaning a filter installation which is used for cleaning transmission vessels in the coal dust injection sphere. In the transmission vessels, coal dust is compressed with nitrogen to a predetermined pressure. When the predetermined pressure is reached, the coal dust is conveyed with the nitrogen pneumatically out of the transmission vessel until there is no longer sufficient coal dust in the transmission vessel. In order to reload the transmission vessel, the pressure of the transmission vessel is matched to the ambient pressure. However, during expansion, the remaining coal dust in the transmission vessel must not pass into the atmosphere. Therefore, the air let out during the expansion is diverted into a filter installation in which a plurality of filtering bags are arranged. The dusty filtering bags can be cleaned with a cleaning system according to the invention during the expansion.

BACKGROUND

Various cleaning systems for filter installations are known which permit cleaning of soiled filters. Filter installations are used in numerous industrial processes and serve fundamentally for cleaning/dedusting a fluid flow which is conducted through such filter installations. In the interior, the filter installations generally have a plurality of filtering bags which free the fluid flowing therethrough from contaminants, such as, for example, dust particles. In most cases, the fluid flow is conducted through the filtering bags from the outside inward, and therefore the contaminants are deposited on the outside of the filtering bags. After a certain operating period, the filtering bags are soiled and have to be cleaned.

To start with, the filters were cleaned by shaking or knocking by means of shaking devices operated by motor or manually. With the aid of such methods, the filtering bags are vibrated and the filter cake detaches from the outer surface of the filters because of said movements. However, the mechanical cleaning has resulted in high stressing of the filtering bags, and therefore the service life thereof is shortened.

In order to reduce the stressing of the filtering bags, a transition is made to cleaning the filtering bags with an air flow which is supplied at a positive pressure in relation to the filter pressure. Particularly cleaning flows which are applied in a pulsed manner to the filtering bags are particularly suitable for efficiently cleaning the filtering bags. Therefore, filtering bags are predominantly cleaned nowadays with the pulse-jet method. In such a method, the cleaning medium is conducted from the inside outward (in the counterflow direction to the fluid flow) through the filtering bags, as a result of which the filter cake is detached from the outer surface of the filtering bags and collected in a dust collection container. The first pulse-jet methods subjected the bag filters to a pulsed cleaning flow at a constant cleaning pressure. However, it has been demonstrated that effective cleaning of the filtering bags is not possible if the cleaning pressure is not matched to the filter pressure.

In order to carry out the cleaning, it is ensured that the pulse which is applied to the bag filters by the cleaning air does not excessively stress the bag filters. A decisive factor here is the positive pressure at which the cleaning medium is supplied. If the positive pressure of the cleaning pressure is selected to be too high in relation to the filter pressure, the service life of the bag filters is reduced. In the worst case, the bag filter may even be destroyed by an excessive positive pressure. However, in the event that the positive pressure has not been selected to be sufficiently high, the bag filter is not efficiently cleaned. Accordingly, the cleaning pressure is regulated in such a manner that it lies within a predetermined range in relation to the filter pressure, and therefore the cleaning pressure suffices in order effectively and gently to clean the bag filter.

U.S. Pat. No. 5,837,017 describes a cleaning device which detects the differential pressure between the "clean side" of the bag filter and the "dirty side" of the bag filter with pressure sensors. The cleaning device in U.S. Pat. No. 5,837,017 is based on the assumption that the soiling of the bag filters depends on the size of the pressure difference measured between the "clean side" and "dirty side". If the size of the pressure difference measured has reached a defined threshold value, the control unit recognizes that the filter is clogged and opens a pressure valve which supplies the cleaning nozzles with cleaning air. The pressure valve is thus controlled by the control unit in such a manner that the cleaning pressure is matched to the pressure difference in the filter. Accordingly, the cleaning pressure is matched to the degree of soiling. In the case of the installation described, the pressure both on the "clean side" and on the "dirty side" is measured with the aid of pressure sensors and forwarded to a control unit.

However, the pressure sensors on the "dirty side" of the bag filter are continuously exposed to contaminants, and therefore reliable detection of the differential pressure is problematic. Since the filter cleaning involves a highly automated process, the maloperation of one of the two pressure sensors can be established from "the outside" only with difficulty. Therefore, a maloperation is only noticed, if at all, when it is already too late, i.e. when the filtering bags either are prematurely torn, or when the filtering bags are clogged up to such an extent that an increased pressure loss occurs in the filter installation.

Furthermore, the installation controls the cleaning via the differential pressures and not via the absolute pressures. If the filter pressure increases, for example because of external influences, the bag filter can no longer be cleaned since the required cleaning pressure can no longer be supplied.

BRIEF SUMMARY

A filter installation is provided which permits a reliable supply of a cleaning pressure pT for cleaning the filtering bags in the case of a variable filter pressure.

In particular, the filter installation comprises:
- a gas feed which supplies a cleaning medium at a feed pressure pN,
- a cleaning tank in which the cleaning medium is stored at a cleaning pressure pT and is fed by the gas feed, wherein pN>pT,
- a pressure filter with a filter pressure pF, which cleans the pressure filter cyclically or in a manner dependent on differential pressure by the cleaning medium from the cleaning tank, characterized in that the filter installation has a control circuit comprising:
- a first differential pressure regulator which is arranged between the gas feed and the cleaning tank, a first control unit which actuates the first differential pressure regulator in the event of a lower pressure difference, a second differential pressure regulator which is arranged in an outlet line of the cleaning tank, a second control unit which actuates the second differential pressure regulator in the event of an upper pressure difference, a positive operative line which fluidically connects the first control unit to the second control unit and to the cleaning tank, a negative operative line which fluidically connects the first control unit to the second control unit and to the pressure filter, wherein a positive pressure of the cleaning pressure pT in relation to the filter pressure pN prevails at the first control unit and the second control unit, wherein the first control unit actuates the first differential pressure regulator when the positive pressure lies below the lower pressure difference, wherein the second control unit actuates the second differential pressure regulator when the positive pressure lies above the upper pressure difference.

According to the invention, the filter installation comprises a gas feed, wherein a preferred refinement of the invention involves a compressed air feed which supplies the filter installation with a cleaning medium at a constant feed pressure pN. Furthermore, the filter installation comprises a cleaning tank which is fed by the gas feed and in which the cleaning medium is stored at a variable cleaning pressure pT, wherein pN≥pT. The filter installation also comprises a pressure filter with a filter pressure pF. The pressure filter is cleaned cyclically at predetermined intervals or in a manner dependent on differential pressure by the cleaning medium from the cleaning tank. In addition, the filter installation has a control circuit which comprises a first differential pressure regulator and a first control unit. The first differential pressure regulator is arranged between the gas feed and the cleaning tank. The first control unit actuates the first differential pressure regulator in the event of a lower pressure difference. Furthermore, the control circuit comprises a second differential pressure regulator and a second control unit. The second differential pressure regulator is arranged in the outlet line of the cleaning tank. The outlet line is preferably arranged between the cleaning tank and the pressure filter. The second control unit actuates the second differential pressure regulator in the event of an upper pressure difference. The control unit also comprises a positive operative line and a negative operative line. The positive operative line fluidically connects the first control unit to the second control unit and to the cleaning tank. The negative operative line fluidically connects the first control unit to the second control unit and to the pressure filter. During operation, the cleaning pressure pT is supplied at a positive pressure in relation to the filter pressure pN in the cleaning tank and prevails at the first control unit and the second control unit. The first control unit actuates the first differential pressure regulator when the positive pressure lies below the lower pressure difference. The second control unit actuates the second differential pressure regulator when the positive pressure lies above the upper pressure difference.

In consequence, it is ensured that the pressure filter is subjected during cleaning to a cleaning pressure pT which permits effective and gentle cleaning of the filter installation without the pressure being measured. During operation, the filter installation supplies the suitable cleaning pressure at any time without even only one sensor being located in the pressure filter. Even in the event of a variation of the filter pressure pF, the filter installation reliably adjusts and adapts the cleaning pressure pT such that reliable filter cleaning is ensured.

In the case of the cleaning device in U.S. Pat. No. 5,837,017, such an adaptation is not possible. This is because the sensors on the "dirty side" of the filter would be soiled because of the dust. Accordingly, U.S. Pat. No. 5,837,017 does not provide any solution for cleaning soiled filters, above all not whenever the filters are cleaned under fluctuating filter pressure. Even in the event that the system does function for a short time (albeit not reliably), the extent to which the cleaning is changed by changes of the filter pressure is not known. The patent describes only a changing of the cleaning flow as a consequence of the strength of the soiling of the filters, wherein the changing is carried out by a control valve. If the filter pressure rises, for example because of external influences, as is the case, for example, during relaxation of the transmission vessels, it is not known how the cleaning device in U.S. Pat. No. 5,837,017 reacts to said influences since the system is not configured for such pressure fluctuations.

The filter installation according to the invention is particularly reliable and independent of external influences because of the fluid connection between the control units. It is precisely in this region of use where a multiplicity of contaminants are virtually "collected" that erroneous measurements, disturbances and failure of sensors are virtually provoked. Since no sensors are required in the case of the filter installation according to the invention in order to ensure self-regulation of the cleaning pressure in relation to the filter pressure, the filter installation according to the invention is particularly reliable.

The filter installation according to the invention ensures that a predetermined positive pressure between the pressure filter and the cleaning tank is always ensured in the event of a fluctuating operating pressure pF (filter pressure). When the filter pressure pF drops or increases, the cleaning pressure in the cleaning tank is adjusted by the control unit, and therefore the pressure difference between the cleaning tank and the pressure filter lies within the predetermined pressure range.

According to a preferred refinement of the invention, the first control unit comprises a first spring with which the lower pressure difference can be adjusted. A first membrane which separates a first positive pressure chamber from a first negative pressure chamber is preferably arranged in the first control unit. The first spring can be adjusted by a first pretensioning device in such a manner that the first spring exerts a first spring pressure on the first membrane. Furthermore, the second control unit can comprise a second spring with which the upper pressure difference can be adjusted. A second membrane which separates a second positive pressure chamber from a second negative pressure chamber is preferably arranged in the second control unit. The second spring can be adjusted by a second pretensioning device in such a manner that the second spring exerts a second spring pressure on the second membrane. The first pretensioning device and the second pretensioning device can be adjusted manually or controlled electronically. The first spring and the second spring permit matching of the first and the second pressure difference. The range of the positive pressure at which the cleaning pressure is intended to be supplied in relation to the pressure filter can therefore be adjusted.

Preferably, the first differential pressure regulator is mechanically coupled to the first control unit and/or the second differential pressure regulator is mechanically coupled to the second control unit. This permits a particularly reliable control of the first pressure difference and of the second pressure difference. Even in the event of a power failure, the differential pressure regulator can control the first pressure difference and/or the second pressure difference.

Alternatively, the first differential pressure regulator can be electrically coupled to the first control unit and/or the second differential pressure regulator can be electronically coupled to the second control unit. This affords the advantage that the control units do not have to be arranged in the immediate vicinity of the differential pressure regulators.

Preferably, the first differential pressure regulator is open in the inoperative state and the second differential pressure regulator is closed in the inoperative state. Filling of the cleaning tank with cleaning air is therefore possible from the inoperative state.

According to a preferred refinement of the invention, the control circuit comprises at least one flow limiter which are provided in the negative and/or positive operative line. By means of the flow limiters in the operative lines, overshoots of the differential pressure regulators can be avoided.

The filter installation is preferably used in coal dust injection installations for cleaning the filters of transmission vessels. The filters are intended to be able to be cleaned both during the expansion and during the compression of the transmission vessel. The filter installation according to the invention is used for this purpose.

BRIEF DESCRIPTION OF THE FIGURES

Further details and advantages of the invention can be gathered from the detailed description below of a possible embodiment of the invention with reference to the attached FIGURE, in which:

FIG. 1 shows a schematic illustration of a preferred filter arrangement.

DESCRIPTION OF A PREFERRED REFINEMENT OF THE INVENTION

FIG. 1 illustrates the construction of a filter installation 2, which operates under fluctuating operating pressure. The filter installation 2 is used as a top filter of the transmission vessel for coal, as a result of which the filter pressure pF changes during operation. The filters are intended to be able to be cleaned both during expansion of the pressure in the transmission vessel and during compression of the pressure in the transmission vessel. Accordingly, the cleaning pressure pT is is carried along with the filter pressure pF. The filter installation 2 is equipped with filtering bags and a pulse-jet cleaning system which cleans the filtering bags either in a manner dependent on differential pressure or else cyclically. So that a filter cake can be detached from the filtering bags, a cleaning pressure pT which lies above the operating pressure pF (which is also called the filter pressure pF) of the pressure filter 4 is supplied for cleaning the filters. If the cleaning pressure pT of the filter installation 2 is too low in relation to the filter pressure pF, the filter cake cannot be detached or cannot be completely detached from the bag filters. Therefore, for the cleaning, the cleaning medium is supplied at a positive pressure in relation to the filter pressure pF. If the positive pressure of the filter installation 2 is too high, this may result in the extreme case in destruction of the filtering bags. Generally, the service life of the filtering bags is shortened by an excessive positive pressure. As a consequence, it is ensured that the positive pressure of the cleaning pressure pT lies within a defined pressure range in relation to the filter pressure pF.

The filter installation in FIG. 1 has a pressure filter 4 for filtering the contaminations. The air to be filtered is conducted through the filtering bags from the outside inward in order to be cleaned. Air, nitrogen or a different inert gas may be used as the cleaning medium for cleaning the bag filters. In this particularly preferred refinement of the invention, compressed air is used for cleaning the filters. The compressed air is supplied at a feed pressure pN at the compressed air feed 6. The feed pressure pN is selected in such a manner that it exceeds the cleaning pressure pT of the cleaning medium in the cleaning tank 8. The compressed air supply has a first differential pressure regulator 10 which is arranged between the cleaning tank 8 and the compressed air feed 6 and regulates a fluid flow between the compressed air feed 6 and the cleaning tank 8. Furthermore, the outlet line 7 from cleaning tank 8 to pressure filter 4 has a second differential pressure regulator 12 which, in the event of an upper pressure difference between cleaning tank 8 and pressure filter 4 being exceeded, lets compressed air out of the cleaning tank 8 via the pressure filter 4 or the pressure filter line 9. The pressure filter line 9 only conducts clean gas which it is provided on the clean side of the pressure filter.

The first differential pressure regulator 10 has a first control unit 14 which controls the opening and closing of the first differential pressure regulator 10. Opening of the first differential pressure regulator 10 fills the cleaning tank 8 with the cleaning medium, which leads to an increase in the cleaning pressure pT in the cleaning tank 8. Closing of the first differential pressure regulator 10 results in there not being any fluidic connection between the cleaning tank 8 and the compressed air feed 6. In the inoperative state, the first differential pressure regulator 10 is opened in order to ensure that the cleaning tank 8 is supplied with air and a first air pressure is provided in the control units 14, 16. The second differential pressure regulator 12 is closed in order to permit the cleaning tank 8 to be filled from the inoperative state.

The second differential pressure regulator 12 has a second control unit 16 which controls the opening and closing of the second differential pressure regulator 12. Opening of the second differential pressure regulator 12 conducts air out of the cleaning tank 8, preferably through the outlet line 7, into the pressure filter 4 and therefore reduces the cleaning pressure in the cleaning tank 8. The second differential pressure regulator 12 is preferably designed in such a manner that it is closed in the inoperative state. This affords the advantage that the pressure filter 4 is not subjected to an excessive cleaning pressure in the event of a failure.

The two control units 14, 16 each have a first pressure chamber 18, 20 and a second pressure chamber 24, 26, which control the differential pressure regulators 10, 12. Depending on the applied pressure difference and the springs 34, 36, the differential pressure controllers 10, 12 are either closed or open. The differential pressure regulators 10, 12 are adjusted in such a manner that they can only assume two states. The first control unit 14 has a first positive pressure chamber 18 and a first negative pressure chamber 20, which are connected to each other via a first flexible membrane 22. The second control unit 16 has a second positive pressure chamber 24 and a second negative pressure chamber 26, which are connected to each other via a second flexible membrane 28. The first positive pressure chamber 18 is fluidically connected to the second positive pressure chamber 24 and to the cleaning tank 8 via the positive operative line 30. The same pressure therefore prevails in the cleaning tank 8, in the first positive pressure chamber 18 and in the second positive pressure chamber 24. Accordingly, the pressure in the positive operative line 30 corresponds to the cleaning pressure.

The first negative pressure chamber 20 is fluidically connected to the second negative pressure chamber 26 and to the pressure filter 4 via a negative operative line 32. The same pressure therefore prevails in the first negative pressure chamber 20, in the second negative pressure chamber 26 and in the pressure filter 4. Accordingly, the pressure in the negative operative line 32 corresponds to the filter pressure.

The positive and the negative operative lines 30, 32 are designed in such a manner that a fluid is conducted in the operative lines. The fluid in the operative lines 30, 32 corresponds to the fluid in the cleaning tank 8 and to the pressure filter 4. The positive operative line 30 has an opening in the cleaning tank 8, via which the pressure equalization between the positive operative line 30 and the cleaning tank 8 is controlled. The negative operative line 32 has an opening in the pressure filter 4, via which the pressure equalization between the negative operative line and the cleaning tank is controlled. Since the operative lines 30, 32 are fluidically connected and only have to ensure the pressure equalization between cleaning tank, first control unit 14 (pressure chamber 18) and second control unit 16 (pressure chamber 24) or pressure filter 4 with first control unit 14 (pressure chamber 20) and second control unit 16 (pressure chamber 26), said operative lines 30, 32 can be selected with a relatively small cross section. A cross section of ⅛ inch (3.175 mm) is preferably used for the operative lines 30, 32. The control circuit which controls the cleaning pressure pT comprises the positive and negative operative lines 30, 32, the first control unit 14 and the second control unit 16, and also the first and second differential pressure regulators 10, 12. In order to improve the adjustability of the first control unit 14 and of the second control unit 16, a first spring 34 is arranged in the first negative pressure chamber 20 and a second spring 36 is arranged in the second negative pressure chamber 26. The two springs 34, 36 serve to adjust the threshold value at which the differential pressure regulators 10, 12 open or close, and can be adjusted in such a manner that the positive pressure of the cleaning pressure can be fixed in relation to the filter pressure. Depending on the adjustment of the first pretensioning device, the first spring 34 exerts a first spring pressure on the first membrane. Depending on the adjustment of the second pretensioning device, the second spring 36 exerts a second spring pressure on the second membrane. The first differential pressure regulator 10 switches depending on the pressure difference between the first positive pressure chamber 18, the first negative pressure chamber 20 and the first spring pressure applied to the first membrane 22. The second differential pressure regulator 12 switches depending on the pressure difference between the second positive pressure chamber 24, the second negative pressure chamber 26 and the spring pressure applied to the second membrane 28.

The control circuit is adjusted in such a manner that the cleaning pressure pT has a predetermined positive pressure in relation to the filter pressure pF in order to be able to effectively clean the pressure filter 4 with the cleaning air at any time. The amount is determined by fixing a lower pressure difference and an upper pressure difference. The lower pressure difference is the amount of the smallest positive pressure that the cleaning tank 8 is intended to supply in relation to the pressure filter 4. If the cleaning pressure in relation to the filter pressure pF lies within the predetermined range between the upper and the lower pressure difference, the first differential pressure regulator 10 and the second differential pressure regulator 12 remains closed. If the filter pressure pF rises such that the pressure difference between the filter pressure pF and the cleaning pressure pT lies below the lower pressure difference, the first differential pressure regulator 10 is opened in order to increase the cleaning pressure pT in the cleaning tank 8. If the filter pressure pF drops such that the pressure difference between the filter pressure and the cleaning pressure lies above the upper pressure difference, the second differential pressure regulator 12 is opened in order to reduce the cleaning pressure by letting the compressed air out via the outlet line 7.

The upper and the lower pressure difference are adjusted by springs 34, 36 in the control unit 14, 16. The first spring 34 is arranged in the first negative pressure chamber 20 of the first control unit 14 and exerts a pressure on the membrane 22 of the first negative pressure chamber 20. The lower pressure difference can be adjusted at the first control unit 10. If the pressure ratio between the first positive pressure chamber 18 and the first negative pressure chamber 20 lies below the threshold value, the first differential pressure regulator 10 opens. As a result, the cleaning tank 8 is fed by the gas feed 6 until the pressure difference lies between the upper and the lower pressure difference. The second spring 36 is arranged in the second negative pressure chamber 26 of the second differential pressure regulator 12 and exerts a pressure on the second membrane 28. If the pressure ratio between the second positive pressure chamber 24 and the second negative pressure chamber 26 lies above the upper pressure difference, the second differential pressure regulator 12 opens. As a result, the compressed air in the cleaning tank 8 is let out via the outlet line 7 into the pressure filter 4. The second differential pressure regulator 12 remains closed as long as the positive pressure does not lie above the upper pressure difference.

By means of such a fluid-conducting control circuit, it is ensured that the cleaning pressure pT in the cleaning tank 8 always lies at a defined amount above the filter pressure pF in the pressure filter 4 irrespective of whether the filter pressure pF increases or drops. However, it should be mentioned briefly that the filter installation does not serve for triggering the actual cleaning operation. For the cleaning, an air flow is conducted from the cleaning tank 8 via one or more pipes (not depicted) into the blowing pipes of the pressure filter 4 (not depicted). The actual cleaning operation is controlled by valves, preferably diaphragm valves (not depicted), which are arranged between the cleaning tank and the pressure filter and, by opening up, clean the bag filters.

The regulation is explained below with reference to 3 different phases each having a different filter pressure pF. In this particularly preferred example, the filtering bags are optimally cleaned at a positive pressure of between 4 and 5 bar. The first differential pressure regulator 10 is therefore adjusted in such a manner that it opens at a first pressure difference of less than 4 bar. The second differential pressure regulator 12 is adjusted in such a manner that it opens from a pressure difference of 5 bar.

In a first phase, the feed pressure is pN=20 bar, the filter pressure is pF=10 bar and the cleaning pressure is pT=14.5 bar. By means of the fluidic connection to the cleaning tank 8, the pressure in the positive operative line 30, in the first positive pressure chamber 18 and in the second positive pressure chamber 24 is likewise 14.5 bar. By means of the fluidic connection to the pressure filter 4, the pressure in the negative operative line 32, in the first negative pressure chamber 20 and in the second negative pressure chamber 26 is likewise 10 bar. A pressure difference of 4.5 bar therefore prevails both in the first control unit 14 and in the second control unit 16. The pressure difference corresponds to the positive pressure of the cleaning pressure in relation to the filter pressure. The pressure difference of 4.5 bar lies within the range in which the bag filters are optimally cleaned. Therefore, both the first differential pressure regulator 10 and the second differential pressure regulator 12 remain closed.

In a second phase, the pressure in the pressure filter has increased to pF=12 bar. The positive pressure in the cleaning tank 8 is therefore 2.5 bar and is therefore too low to permit efficient cleaning of the filtering bags. Therefore, the first differential pressure regulator 10 opens and the cleaning tank 8 is filled with cleaning air in order to increase the cleaning pressure in the cleaning tank 8. The first differential pressure regulator 10 remains open until the pressure difference between the cleaning tank 8 and pressure filter 4 is again 4 bar. The second differential pressure regulator 12 remains closed because of the pressure difference of 2.5 bar.

In a third phase, the pressure in the pressure filter 4 has dropped to pF=8 bar. Accordingly, the positive pressure is 6.5 bar, as a result of which the first differential pressure regulator 10 remains closed and the second differential pressure regulator 12 opens. The second differential pressure regulator 12 remains open until the pressure difference between the cleaning tank 8 and the pressure filter 4 is again 5 bar.

The filter installation 2 is therefore self-regulating. As soon as the filter pressure changes so that a predetermined pressure difference between filter pressure and cleaning pressure is no longer observed, the cleaning pressure is tracked by the interaction of the two differential pressure regulators 10, 12 in such a manner that the required positive pressure is ensured. The cleaning pressure is, of course, tracked even if the pressure in the cleaning tank 8 changes. This occurs whenever compressed air for the cleaning is removed from the cleaning tank (fittings and lines for the cleaning are not illustrated here). By means of this removal, the pressure in the cleaning tank 8 drops, and, consequently, the pressure difference between cleaning tank 8 and pressure filter 4 also drops, and, consequently, the differential pressure regulator 10 opens until the pressure difference is again 4 bar.

Two flow limiters which limit the maximum volumetric flow flowing through the operative lines 30, 32 can in each case be arranged in the operative lines 30, 32. The positive flow limiters 38, 39 are arranged in the positive operative line 30 and the negative flow limiters 40, 41 are arranged in the negative operative line 32. Oscillations of the differential pressure regulators 10, 12 can be avoided by limiting the maximum volumetric flow in the operative lines 30, 32.

The invention claimed is:

1. A filter installation comprising:
   a gas feed which supplies a cleaning medium at a feed pressure pN,
   a cleaning tank in which the cleaning medium is stored at a cleaning pressure pT and is fed by the gas feed, wherein pN>pT,
   a pressure filter with a filter pressure pF, which is cleaned, wherein the filter installation has a control circuit comprising:
   a first differential pressure regulator which is arranged between the gas feed and the cleaning tank,
   a control circuit having a first control unit, which actuates the first differential pressure regulator in the event of a lower pressure difference,
   a second differential pressure regulator which is arranged in an outlet line of the cleaning tank, wherein the outlet line supplies the cleaning medium to the pressure filter, the control circuit further includes a second control unit that is operative to actuate the second differential pressure regulator in the event of an upper pressure difference,
   a positive operative line which fluidically connects the first control unit of the control circuit to the second control unit of the control circuit and to the cleaning tank,
   a second operative line which fluidically connects the first control unit of the control circuit to the second control unit of the control circuit and to the pressure filter,
   wherein a positive pressure of the cleaning pressure pT in relation to the filter pressure pF prevails at the first control unit of the control circuit and the second control unit of the control circuit, wherein the first control unit of the control circuit actuates the first differential pressure regulator when the positive pressure lies below the lower pressure difference, wherein the second control unit of the control circuit actuates the second differential pressure regulator when the positive pressure lies above the upper pressure difference.

2. The filter installation as claimed in claim 1, wherein the first control unit of the control circuit comprises a first spring with which the first predetermined pressure difference is adjustable, and wherein the second control unit of the control circuit comprises a second spring with which the second predetermined pressure difference is adjustable.

3. The filter installation as claimed in claim 1, wherein the first differential pressure regulator is mechanically coupled to the first control unit of the control circuit and/or wherein the second differential pressure regulator is mechanically coupled to the second control unit of the control circuit.

4. The filter installation as claimed in claim 1, wherein the first differential pressure regulator is electronically coupled to the first control unit of the control circuit and/or wherein the second differential pressure regulator is electronically coupled to the second control unit of the control circuit.

5. The filter installation as claimed in claim 1, wherein the first differential pressure regulator is open in the inoperative state and the second differential pressure regulator is closed in the inoperative state.

6. The filter installation as claimed in claim 1, wherein the filter plant is arranged in a transmission vessel, and cleaning of the filters can be carried out in the transmission vessel both during the compression and during the expansion of the cleaning medium.

7. The filter installation as claimed in claim 1, wherein the control circuit comprises at least one flow limiter which are provided in the negative and/positive operative line.

8. The filter installation as claimed in claim 2, wherein the first differential pressure regulator is mechanically coupled to the first control unit and/or wherein the second differential pressure regulator is mechanically coupled to the second control unit.

9. The filter installation as claimed in claim 2, wherein the first differential pressure regulator is electronically coupled to the first control unit and/or wherein the second differential pressure regulator is electronically coupled to the second control unit.

10. The filter installation as claimed in claim 2, wherein the first differential pressure regulator is open in the inoperative state and the second differential pressure regulator is closed in the inoperative state.

11. The filter installation as claimed in claim 2, wherein the filter plant is arranged in a transmission vessel, and cleaning of the filters can be carried out in the transmission vessel both during the compression and during the expansion of the cleaning medium.

12. The filter installation as claimed in claim 2, wherein the control circuit comprises at least one flow limiter which are provided in the negative and/positive operative line.

\* \* \* \* \*